(12) United States Patent
Van Hoeckel et al.

(10) Patent No.: US 9,503,643 B1
(45) Date of Patent: Nov. 22, 2016

(54) ELECTRONIC DEVICE AND METHOD OF CONTROLLING SAME FOR CAPTURING DIGITAL IMAGES

(71) Applicant: BlackBerry Limited, Waterloo (CA)

(72) Inventors: Martin Frank Clayton Van Hoeckel, Woodstock (CA); Sung Ho Hong, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 14/924,410

(22) Filed: Oct. 27, 2015

(51) Int. Cl.
| | |
|---|---|
| *G03B 15/03* | (2006.01) |
| *H04N 5/232* | (2006.01) |
| *H04N 5/235* | (2006.01) |
| *H04N 9/73* | (2006.01) |
| *H04M 1/02* | (2006.01) |

(52) U.S. Cl.
CPC ....... *H04N 5/23241* (2013.01); *H04M 1/0264* (2013.01); *H04N 5/2351* (2013.01); *H04N 5/2352* (2013.01); *H04N 9/73* (2013.01); *G03B 15/03* (2013.01); *H04N 5/2354* (2013.01)

(58) Field of Classification Search
CPC ..................................................... G03B 15/05
USPC ........................................................ 396/157
See application file for complete search history.

(56) References Cited

U.S. PATENT DOCUMENTS

| 8,040,069 | B2* | 10/2011 | Drader | H04N 5/2256 |
| | | | | 315/200 A |
| 2002/0061192 | A1* | 5/2002 | Kawasaki | G03B 15/05 |
| | | | | 396/182 |
| 2002/0064383 | A1* | 5/2002 | Kawasaki | G03B 15/05 |
| | | | | 396/157 |
| 2009/0040332 | A1* | 2/2009 | Yoshino | H04N 5/2354 |
| | | | | 348/222.1 |
| 2009/0160944 | A1* | 6/2009 | Trevelyan | H04N 5/2354 |
| | | | | 348/187 |

(Continued)

OTHER PUBLICATIONS

Quoc Kien Vuong et al., "A New Auto Exposure and Auto White-Balance Algorithm to Detect High Dynamic Range Conditions Using CMOS Technology", ISBN: 978-988-98671-0-2, Proceedings of the World Congress on Engineering and Computer Science 2008, WCECS 2008, Oct. 22-24, 2008, San Francisco, USA.

(Continued)

*Primary Examiner* — David Gray
*Assistant Examiner* — Kevin Butler
(74) *Attorney, Agent, or Firm* — Borden Ladner Gervais LLP; Geoffrey deKleine

(57) ABSTRACT

A method of controlling a portable electronic device including a digital camera for setting automatic exposure and automatic white-balance values for capturing a digital image. The method includes identifying an available current for a main flash output of the digital camera for capturing the digital image, in response to determining that the available current for the main flash output is less than a full current value, identifying a corresponding current value for a preflash output based on the available current for the main flash output and setting the current value for the preflash output to the corresponding current value, actuating the preflash output utilizing the corresponding current value and receiving light at an image sensor, and based on the light received at the image sensor, setting automatic exposure and automatic white-balance values for use in capturing the digital image.

11 Claims, 4 Drawing Sheets

(56) References Cited

U.S. PATENT DOCUMENTS

| | | | | |
|---|---|---|---|---|
| 2011/0280560 A1* | 11/2011 | Lin | ............. | G03B 7/16 |
| | | | | 396/157 |
| 2011/0298947 A1* | 12/2011 | Guo | ............. | H04N 5/2354 |
| | | | | 348/224.1 |
| 2012/0257102 A1* | 10/2012 | Nakagawara | ........ | H04N 5/2256 |
| | | | | 348/371 |
| 2015/0229820 A1* | 8/2015 | Chu | ............. | H04N 9/735 |
| | | | | 348/224.1 |

OTHER PUBLICATIONS

Michael Muehlebach, "Camera Auto Exposure Control for VSLAM Applications", Swiss Federal Institute of Technology Zurich, Studies on Mechatronics, Autumn Term 2010.

* cited by examiner

ELECTRONIC DEVICE AND METHOD OF CONTROLLING SAME FOR CAPTURING DIGITAL IMAGES

FIELD OF TECHNOLOGY

The present disclosure relates to the control of electronic devices to capture digital photographs.

BACKGROUND

Electronic devices, including portable electronic devices, have gained widespread use and may provide a variety of functions including, for example, telephonic, electronic messaging and other personal information manager (PIM) applications, digital camera and digital photograph storage, and so forth.

Advances leading to decreased size of digital camera components have provided easier integration in devices that are generally intended for handheld use and ease of portability. Portable electronic devices may also include a flash component or components for providing additional light during photography in low-light locations, such as indoors.

Flash devices such as LED flashes used in portable electronic devices provide additional light in a compact size. Image quality using an LED flash varies, however, depending on a number of factors including, for example, general ambient lighting.

Further improvements in digital camera components are desirable and are driven by consumer demand for better image quality and increased resolution.

BRIEF DESCRIPTION OF THE DRAWINGS

Embodiments of the present disclosure will now be described, by way of example only, with reference to the attached figures, in which.

DETAILED DESCRIPTION

Figure 1:
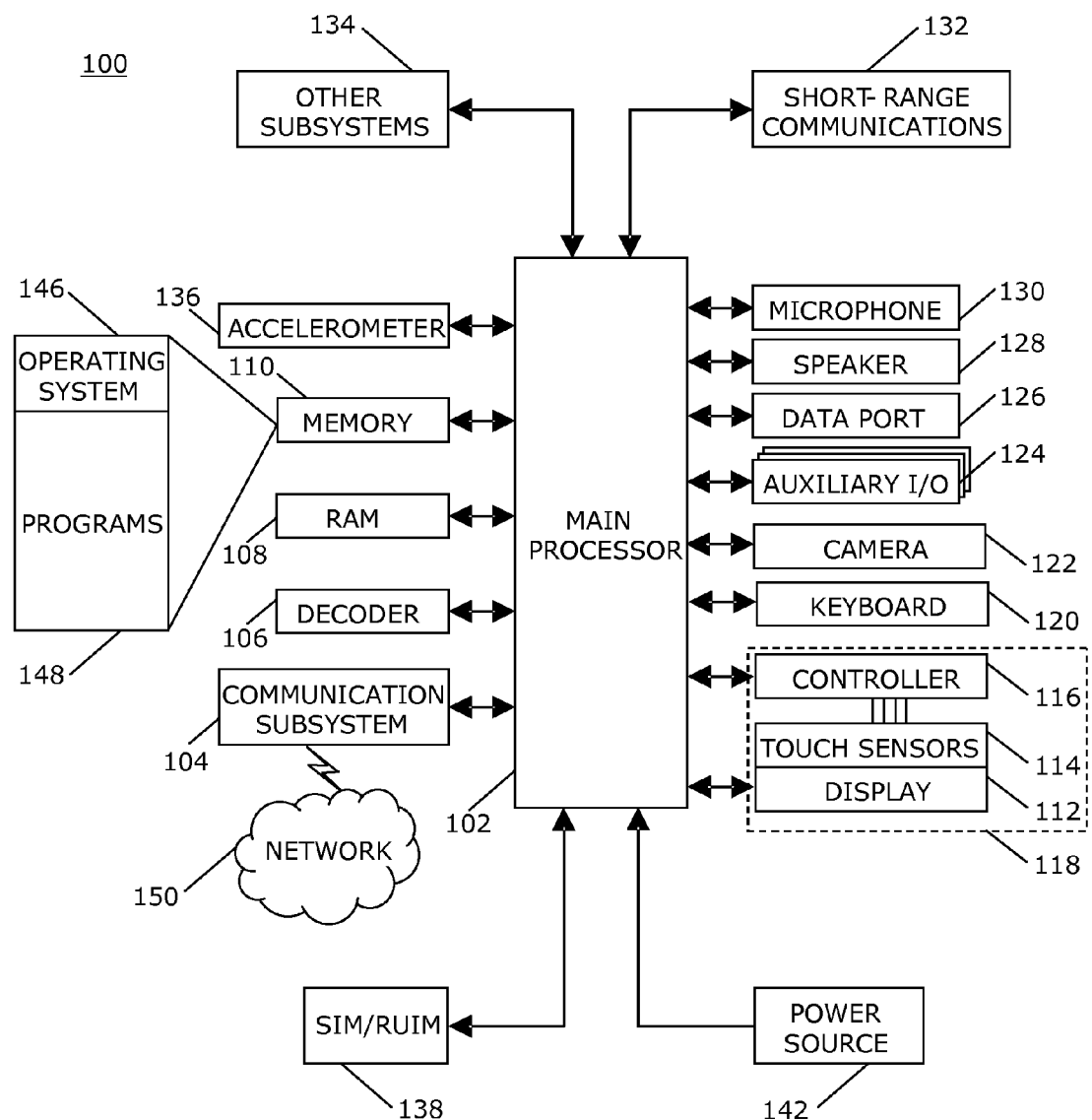
FIG. 1 is a block diagram of a portable electronic device in accordance with the present disclosure.

The following generally describes an electronic device including a digital camera and a method of controlling the electronic device for setting automatic exposure and automatic white-balance values for capturing a digital image. The method includes identifying an available current for a main flash output of the digital camera for capturing the digital image, in response to determining that the available current for the main flash output is less than a full current value, identifying a corresponding current value for a preflash output based on the available current for the main flash output and setting the current value for the preflash output to the corresponding current value, actuating the preflash output utilizing the corresponding current value and receiving light at an image sensor, and based on the light received at the image sensor, setting automatic exposure and automatic white-balance values for use in capturing the digital image.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device such as a portable electronic device. Examples of portable electronic devices include mobile, or handheld, wireless communication devices such as cellular phones, cellular smart-phones, wireless organizers, personal digital assistants, wirelessly enabled notebook computers, tablet computers, cameras, mobile internet devices, and so forth.

A block diagram of an example of an electronic device 100, which in the present example is a portable electronic device, is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A battery 142, which may include one or more rechargeable batteries, powers the electronic device 100.

The processor 102 interacts with other components, such as a Random Access Memory (RAM) 108, memory 110, a touch-sensitive display 118, a keyboard 120, a camera 122, an auxiliary input/output (I/O) subsystem 124, a data port 126, a speaker 128, a microphone 130, short-range communications 132 and other device subsystems 134. The speaker 128, also referred to as an earpiece speaker, is utilized to output audible signals when a user's ear is very close to the speaker 128. Although not shown, the processor may also interact with a loudspeaker, for example, for handsfree use. The keyboard 120 may be utilized for entry of characters such as alphabetical characters, numeric characters, punctuation, or symbols.

The touch-sensitive display 118 includes a display 112 and touch sensors 114 that are coupled to at least one controller 116 that is utilized to interact with the processor 102. Input via a graphical user interface is provided via the touch-sensitive display 118 and the keyboard 120. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

By repeatedly scanning the electrodes of the touch-sensitive display 118 to detect touches, movement of a touch relative to the touch-sensitive display 118 may be detected. One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch-sensitive display 118 includes a display area in which information may be displayed, and a non-display area extending around the periphery of the display area. Information is not displayed in the non-display area by the display. The non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed in the non-display area. Touch sensors including drive electrodes and sense electrodes may be disposed in the non-display area, which touch sensors may be extended from the touch sensors in the display area or may be distinct or separate touch sensors from the touch sensors in the display area. A touch, including a gesture, may be associated with, i.e., performed on, the display area, the non-display area, or both areas. The touch sensors including the drive electrodes and the sense electrodes may extend across substantially the entire non-display area or may be disposed in only part of the non-display area.

Figure 2:
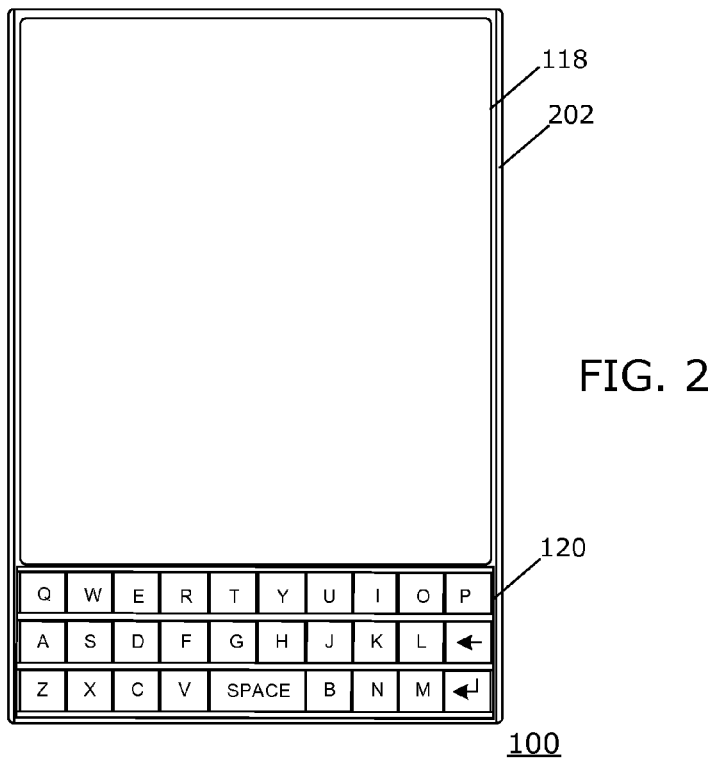
FIG. 2 is a front view of an example of a portable electronic device in accordance with the disclosure.
Figure 3:
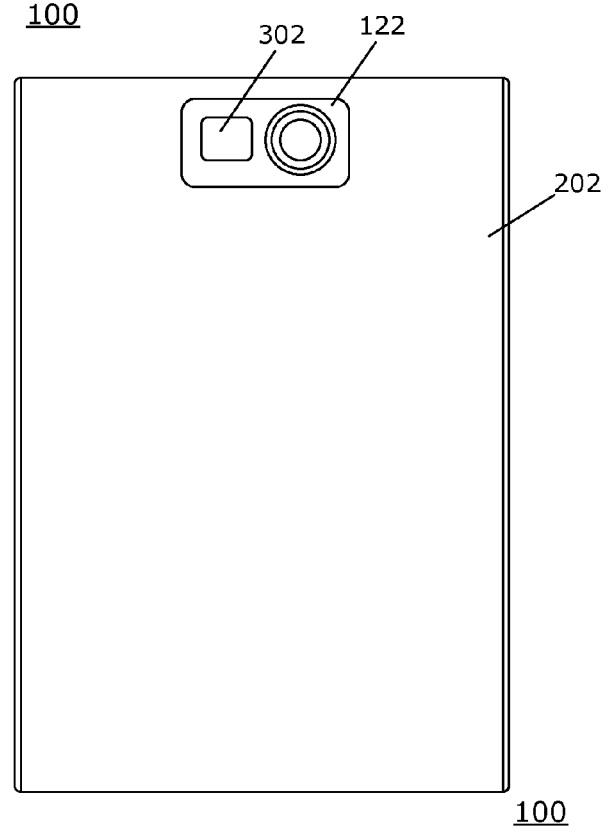
FIG. 3 is rear view of the example of the portable electronic device of FIG. 2.

An example of an electronic device 100 is shown in FIG. 2 and in FIG. 3. In the example of FIG. 2, the electronic device 100 includes a housing 202 in which the touch-sensitive display 118 is disposed. The housing 202 is utilized to enclose components such as the components shown in FIG. 1. The touch-sensitive display 118 is utilized to display information including digital images captured utilizing the camera 122. The keyboard 120 may optionally be utilized as or as part of the user interface for the camera 122. The camera 122 includes a flash output arrangement 302 for providing light, in addition to ambient light, when a digital image is captured.

Software for controlling the camera 122 is stored on the portable electronic device 100, for example, in the programs in the memory 110. By pressing, for example, a key on the keyboard 120, by selecting an on-screen menu option or icon, or by depressing a button on the portable electronic device 100, the camera 122 is turned on as the camera application is launched. The camera 122 is employed for capturing, also referred to as taking, digital images by, for example, pressing a key on the keyboard 120 or by pressing a button or other input device. The camera 122 may also be utilized for capturing video images. A digital image, also referred to as a digital photograph, that is captured may be displayed on the touch-sensitive display 118 and the digital image may be saved as a digital photograph file in a digital photograph database resident on the portable electronic device 100, for example, in the memory 110.

The associated camera application facilitates user interaction with the camera 122, including, for example, zooming in and out, changing the resolution of the captured image, turning the flash output arrangement on, off, or to an automatic setting, and so forth.

Digital images captured utilizing the camera 122 may be stored in any suitable format in the memory 110, for example, and may be retrieved, for example, for viewing, for setting as a background on the touch-sensitive display 118, or for sending as an attachment in a message.

Figure 4:
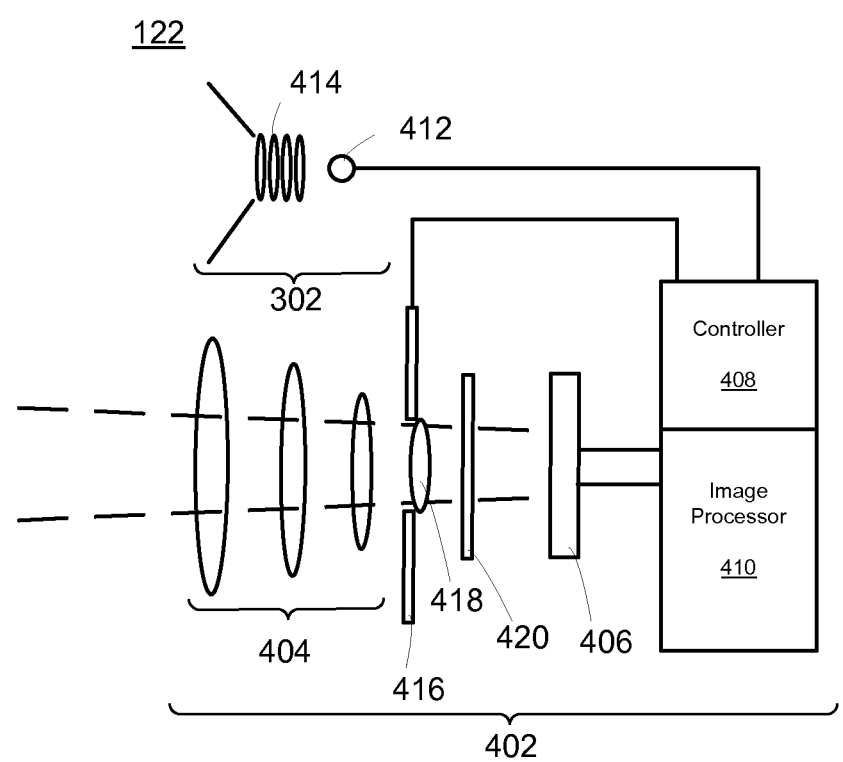
FIG. 4 is a functional diagram of a camera in accordance with the disclosure.

A schematic view of the camera 122 is shown in FIG. 4. The camera 122 includes the flash output arrangement 302 and an image capturing system 402 both framed by the housing 202. In the present example, the flash output arrangement 302 includes a white LED light source 412 and a lens array 414 aligned in an axis for providing a preflash output and a main flash output from the LED light source 412.

The image capturing system 402 includes components such as an optical system of lenses 404 through which light passes, an image sensor 406, a controller 408 and an image processor 410. The outermost one of the lenses 404 may be covered by a suitable protective surface for protecting the lenses 404. The light passes from the lenses 404 through a shutter 416, through a suitable fixed diaphragm 418, through a band-pass filter 420 for filtering out, for example, high and low frequency light while allowing visible light to pass through, and to the image sensor 406. In the present example, the camera 122 includes the shutter 416. Alternatively, the camera 122 may be constructed without a shutter 416. A shutter may be utilized to control the time during which light is received at the image sensor 406 when capturing a digital image. Rather than a shutter, the time during which light is received at the image sensor 406 may be controlled electronically based on time of exposure of the lines of the image sensor 406 to light before reading out.

An image processor 100 is coupled to the image sensor 406 for capturing an image and the controller 408 controls the flash output arrangement 302 to provide the flash output. In the present embodiment, the controller 408 is a functional unit that is part of the image processor 410. Alternatively, the controller 408 may be a separate unit coupled to the image processor 41. Other features or functional units such as timer and driver components are also provided. Such features and functional units and are not shown in FIG. 5 for the purpose of clarity of illustration and description.

The lenses 404, the shutter 416, and the diaphragm 418 together receive light when the camera 122 is in use and direct light through the filter 420 toward the image sensor 406. The shutter 416 may be utilized to control the amount of light that is allowed to passes through the lenses 404 to the image sensor 406. The image processor 410 determines, based on the received light, the autofocus location or distance, automatic exposure, and automatic white-balance values, which are the settings that are controlled for capturing the digital image. Methods for adjusting the exposure, and white-balance for automatic exposure and automatic white-balance values are known and are dependent on the luminance, or intensity of light, and the color temperature of the light received at the image sensor 406. Thus, the automatic exposure and automatic white-balance values are dependent on the intensity of light from the flash output arrangement 392 and the color temperature of the light from the flash output arrangement 302.

The image sensor 406 includes, for example, a charge coupled device (CCD) sensor surface for receiving the light that passes through the lenses 404, shutter 416, fixed diaphragm 418, and filter 420. The light received at the image sensor 406 is converted to electrical signals by photo-electric conversion of light received at each pixel of the sensor surface of the image sensor 406 to a signal. The signals from all of the pixels together form an image signal that is used in creating the digital image on the display 112 of the portable electronic device 100.

In conditions in which a flash output arrangement 302 is utilized, a preflash output is utilized to provide light to determine the automatic focus, automatic exposure, and automatic white-balance values prior to the main flash and capture of the digital image. The flash output may be utilized in any suitable conditions, for example, in bright light conditions for a fill flash, or in low light conditions, indoors or at night. A preflash output is a flash output of light from the flash output arrangement 302 that is created or provided utilizing relatively low current compared to the main flash output. The image processor 410 receives the signals from the image sensor 406 and processes the signals to determine the automatic focus, automatic exposure, and automatic white-balance values referred to above. Thus, the automatic focus, automatic exposure, and automatic white-balance values are determined and set based on the preflash output and the set values are utilized for capturing the image at the image sensor 406 during the main flash output.

Figure 5:
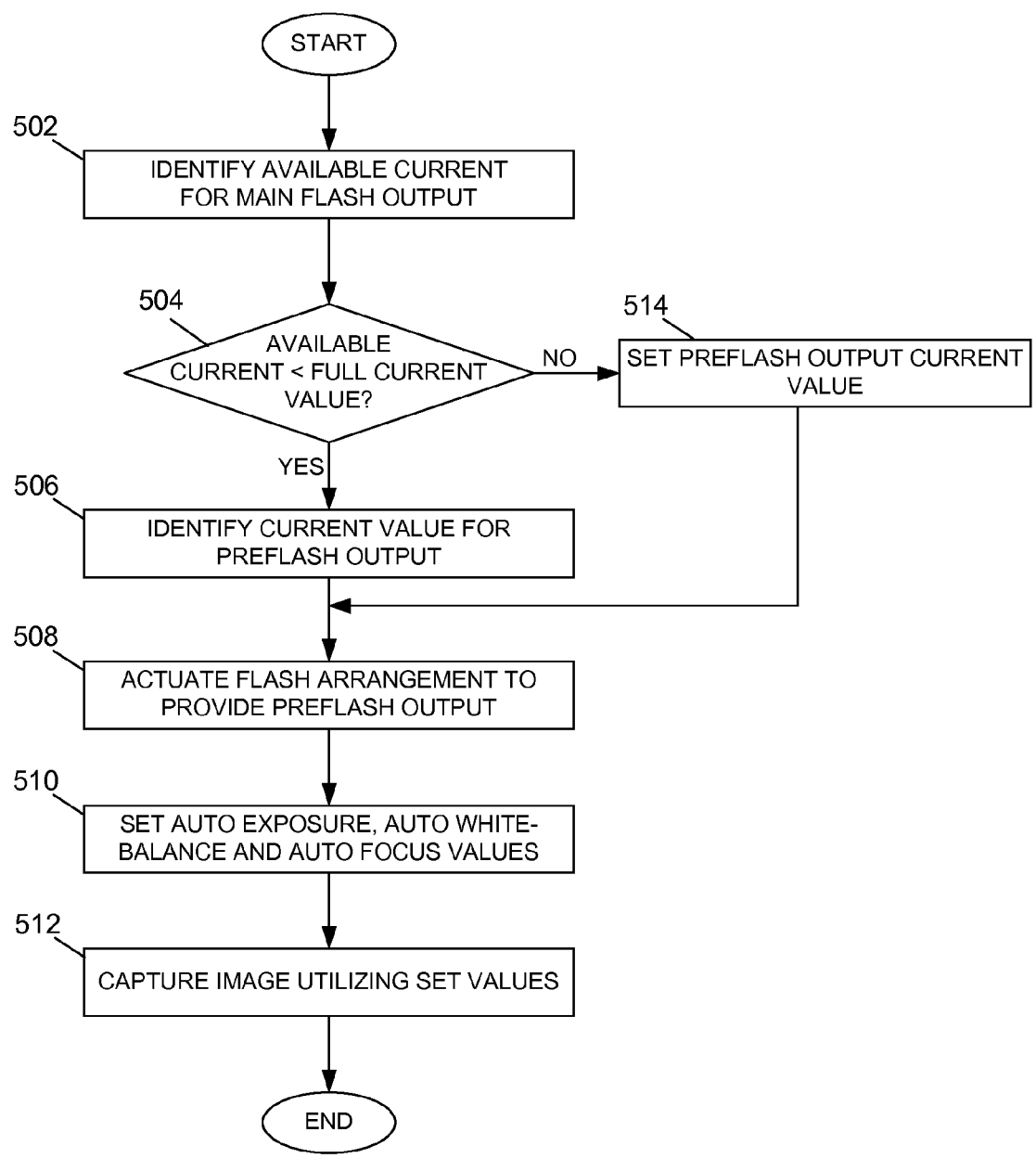
FIG. 5 is flowchart illustrating a method of controlling a portable electronic device including the camera of FIG. 4.

A flowchart illustrating a method of controlling the camera 122 is shown in FIG. 5. The method may be carried out by software executed, for example, by the processor 102 and the image processor 410. Coding of software for carrying out such a method is within the scope of a person of ordinary skill in the art given the present description. The method may contain additional or fewer processes than shown and/or described, and may be performed in a different order. Computer-readable code executable by a processor 102 and the image processor 410 of the portable electronic device 100 to perform the method may be stored in a computer-readable storage medium, such as a non-transitory computer-readable medium.

The method may be carried out in response to receipt of an input, for example, from depression of a key on the keyboard 120 or a button or other input device, to capture an image. In response to the input to capture an image, an available current for the main flash output is identified at 502. The available current for the main flash output is identified by determining the current available from the battery 142 for providing to the flash output arrangement 302. For example, the battery 142 may be routinely monitored to identify voltage, equivalent series resistance (ESR) and, based on electrical load, which is the, the available current is determined.

The available current varies based on the charge level of the battery 142. Thus, when the battery 142 is fully charged, the available current is higher than when the battery 142 is relatively low in charge, for example, at 10%. A change in the current supplied to the flash output arrangement 302 affects the flash output, for example, changing the intensity and color temperature of the light provided by the main flash output. Thus, as the battery charge level lowers, the current utilized to provide the main flash output is reduced.

The available current identified at 502 is then utilized to set a current for a preflash output. For example, the available current identified at 502 may be compared to a full current value at 504. The full current value is the expected available current for the main flash output when the battery 142 is in a fully charged state. The full current value may be a preset value, such as a factory set value, or may identified or set when the battery 142 is in the fully charged state. In response to determining that the available current for the main flash output is less than the full current value at 504, the method continues at 506, and a reduced current value is identified for the preflash output at 506.

The reduced current value identified at 506 may be calculated mathematically or may be determined, for example, from a lookup table for identifying the reduced current value based on ranges of available current for the main flash output. The reduced current value is identified to maintain a generally constant ratio of corresponding current value for the preflash output to the available current for the main flash output throughout a range of battery charge states. Thus, a ratio of the corresponding current value for the preflash output to the current value for the main flash output when the battery is in a fully charged state is generally the same as the ratio of the corresponding current value for the preflash output to the current value for the main flash output when the battery is in a relatively low charge state. The ratio may be a predetermined or preselected number. Thus, as with the current for the main flash output, the current utilized for the preflash output varies with charge level of the battery.

The flash output arrangement 302 is actuated at 508 to provide the preflash output utilizing the current value identified at 506. The image processor 410 receives the signals from the image sensor 406 and processes the signals to determine the automatic focus, automatic exposure, and automatic white-balance values at 510. Thus, the automatic focus, automatic exposure, and automatic white-balance values are determined and set based on the preflash output provided utilizing the current value identified at 506.

The flash output arrangement 302 is then actuated and the digital image is captured by the image processor 410 at 512 utilizing the automatic focus, the automatic exposure, and the automatic white-balance values set at 510. Thus, the digital image is captured based on the light received at the image sensor during the preflash output utilizing the corresponding current value identified at 506.

In response to determining that the available current for the main flash output is not less than the full current value at 504, the method continues at 514, and a full preflash output current value is utilized. The method continues from 514 to 508 where the output arrangement 302 is actuated to provide the preflash output utilizing the full current value. In this case, the automatic focus, automatic exposure, and automatic white-balance values are determined and set based on the preflash output provided utilizing the full current value.

Advantageously, a ratio of the corresponding current value for the preflash output to the current value for the main flash output is generally constant, independent of the charge state of the battery. Thus, the ratio of the corresponding current value for the preflash output to the current value for the main flash output is generally the same when the battery is in a fully charged state as the ratio when the battery is in a relatively low charge state. Utilizing a generally consistent ratio, more accurate or desirable automatic exposure and automatic white-balance values are determined, thereby providing better quality images when the battery is in a relatively low charge state, by comparison to images captured utilizing a constant current preflash output that is independent of charge state of the battery.

The scope of the claims should not be limited by the preferred embodiments set forth in the examples, but should be given the broadest interpretation consistent with the description as a whole.

What is claimed is:

1. A method of controlling a portable electronic device including a digital camera for setting automatic exposure and automatic white-balance values for capturing a digital image, the method comprising:
   identifying an available current for a main flash output for capturing the digital image;
   in response to determining that the available current for the main flash output is less than a full current value, identifying a corresponding current value for a preflash output based on the available current for the main flash output to maintain a generally constant ratio of the corresponding current value for the preflash output to the available current for the main flash output, and setting the current value for the preflash output to the corresponding current value;
   actuating the preflash output utilizing the corresponding current value and receiving light at an image sensor;
   based on the light received at the image sensor, setting automatic exposure and automatic white-balance values for use in capturing the digital image;
   actuating the main flash output and capturing the digital image utilizing the automatic exposure and automatic white-balance values set based on the light received at the image sensor during the preflash output utilizing the corresponding current value.

2. The method according to claim 1, wherein the corresponding current value for the preflash output is identified to maintain the generally constant ratio of corresponding current value for a preflash output to the available current for the main flash output as a battery charge of the portable electronic device changes.

3. The method according to claim 1, wherein the full current value is a predetermined current value.

4. The method according to claim 1, wherein the full current value is a current value from a battery of the portable electronic device at a fully charged state and the available current is the current available for operating the main flash.

5. The method according to claim 1, wherein the available current is identified based on monitoring of the battery voltage, equivalent series resistance (ESR), and electrical load.

6. A non-transitory computer-readable medium having computer-readable code stored thereon, the computer-readable code executable by at least one processor of a portable electronic device to perform the method according to claim 1.

7. An electronic device comprising:
   a digital camera including a flash output arrangement;
   a battery for providing power for the operating the digital camera;
   a processor coupled to the battery and to the digital camera to:
      identify an available current from the battery for a main flash output from the flash output arrangement for capturing a digital image;
      in response to determining that the available current from the battery for the main flash output is less than a full current value, identify a corresponding current value for a preflash output from the flash output arrangement based on the available current to maintain a generally constant ratio of the corresponding current value for the preflash output to the available current for the main flash output, and set the current value for the preflash output to the corresponding current value;
      actuate the preflash output utilizing the corresponding current value and receive light at an image sensor;
      based on the light received at the image sensor, setting automatic exposure and automatic white-balance values for use in capturing the digital image; and
      actuate the main flash output and capture the digital image utilizing the automatic exposure and automatic white-balance values set based on the light received at the image sensor during the preflash output utilizing the corresponding current value.

8. The electronic device according to claim 7, wherein the corresponding current value for the preflash output is identified to maintain the generally constant ratio of the corresponding current value for a preflash output to the available current for the main flash output as a battery charge of the portable electronic device changes.

9. The electronic device according to claim 7, wherein the full current value is a predetermined current value.

10. The electronic device according to claim 7, wherein the full current value is a current value from the battery of the portable electronic device at a fully charged state and the available current is the current available for operating the main flash.

11. The electronic device according to claim 7 wherein the available current is identified based on monitoring of the battery voltage, equivalent series resistance (ESR), and electrical load.

* * * * *